Aug. 15, 1967  G. H. LOCKWOOD  3,335,959

LAWN SPRINKLER

Filed April 30, 1965

INVENTOR

George H. Lockwood

United States Patent Office 3,335,959
Patented Aug. 15, 1967

3,335,959
LAWN SPRINKLER
George H. Lockwood, Wilton Manors, Fla.
(2125 NE. 27th Drive, Fort Lauderdale, Fla. 33305)
Filed Apr. 30, 1965, Ser. No. 452,061
3 Claims. (Cl. 239—204)

This invention relates to lawn sprinklers and, more particularly, to the automatic elevating or pop-up type.

In the irrigation of lawns and other vegetation which may produce a dense growth at the ground level, it is necessary to produce the desired spray of water appreciably above the top of the vegetation and at such a point of origin that the vegetation will not interrupt or interfere with the spray. This is accomplished in various ways. The sprinkler nozzle may be located in a clear area formed by a metal or concrete ring around the nozzle, or located on a standpipe above the level of vegetation. The most desirable method is to mount the sprinkler nozzle on a mechanism so constructed that water pressure will cause the mechanism to elevate the nozzle above the vegetation level during the operating time, at the end of which time the absence of pressure in the supply line will cause the mechanism to retract to a position such that it is no longer visible or an obstacle to pedestrians, lawn mowers or vehicles. Several types of such mechanisms have been devised in prior art, however there are many objections to the previous devices. Because of the small size and general complexity of these mechanisms, they are subject to malfunction from grass growth, mechanical breakage and particularly sand or foreign matter introduced with the water or from outside.

It is, therefore, an outstanding object of this invention to provide an automatic elevating sprinkler mechanism which will be virtually unaffected by small particles of sand or other solid material which may be present either inside or outside of the mechanism.

Another object of this invention is to provide an automatic elevating sprinkler mechanism which will eliminate the necessity of removing grass or other vegetation in close proximity to the unit.

A further object of the present invention is the provision of a mechanism which will elevate a sprinkler nozzle to the optimum position for operation and retract it well below the vegetation level when not in use.

A still further object of the invention is to provide a sprinkler mechanism which is simple in construction, inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawing in which.

Figure 2:
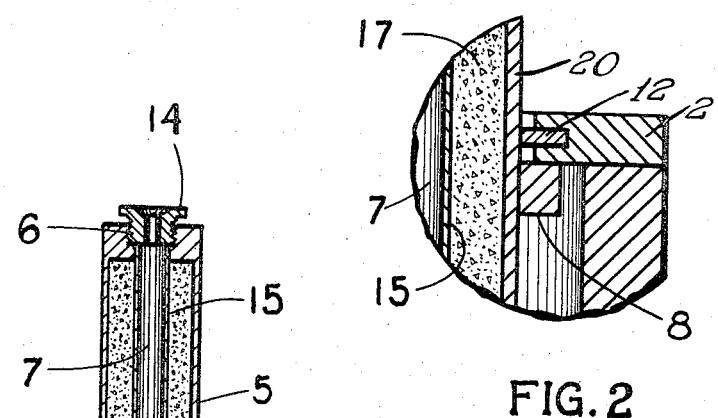
FIG. 2 is an enlarged sectional view of the area encircled and indicated on FIG. 1.
Figures 1, 3:
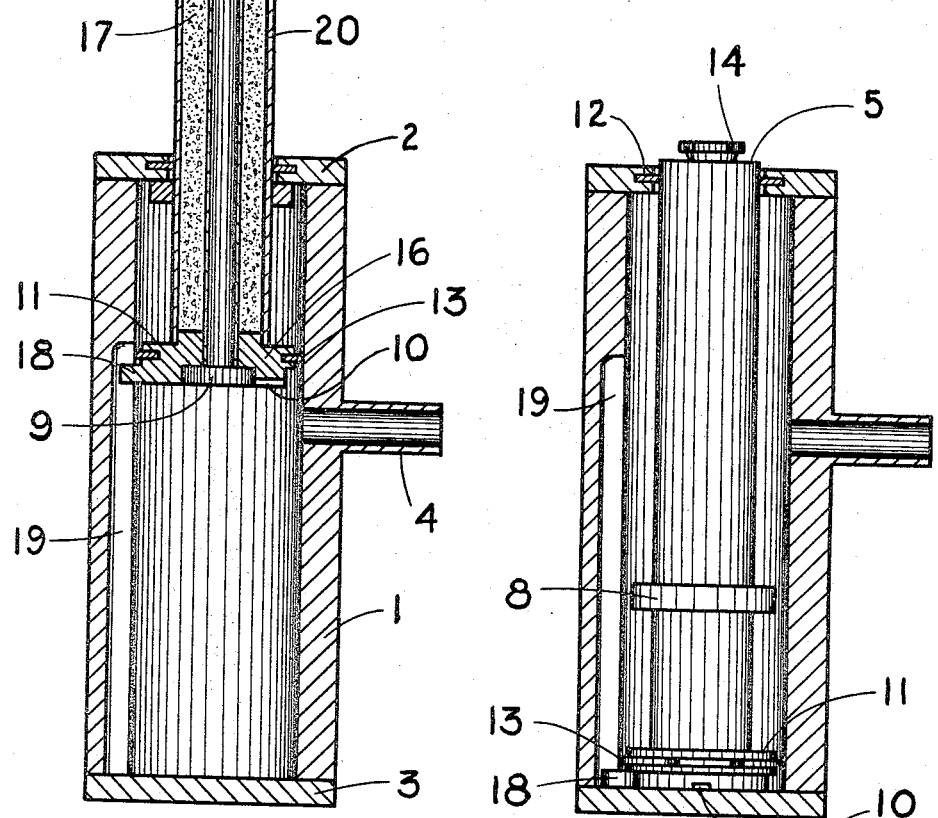
FIG. 1 is a sectional view of an automatic elevating sprinkler embodying the principles of the present invention, showing the mechanism in the extended position.
FIG. 3 is a partially sectioned view of an automatic elevating sprinkler embodying the principles of the present invention, showing the mechanism in the retracted position.

Referring to the drawing, FIGS. 1–3, there is shown the details of an automatic elevating sprinkler embodying the present invention. Numeral 1 indicates a main body and is shown as a cylindrical tube having an axial keyway 19 and a radial projecting supply pipe 4. Rigidly attached by any conventional method to main body 1 is a bottom cap 3 and a top ring 2.

Inside of the main body 1 is an elevating ram assembly generally indicated by numeral 5. This assembly is composed of an outer cylindrical shell 20 which is suitably threaded at the top end 6 to receive conventional spray nozzles 14 well known to those skilled in the art. Inside and co-axial with outer shell 20 is a tube 15. At the bottom of the elevating ram assembly 5 is an end cap 16. Tube 15 is suitably pressed or welded into the top end of outer shell 20 and the center bore of end cap 16, end cap 16 also being pressed or welded into outer shell 20. The space thus formed between outer shell 20 and tube 15, being a closed end annular cylindrical cavity, is filled with an inexpensive heavy material such as sand or concrete indicated by numeral 17. On the outside of outer shell 20 is fastened an annular stop ring 8.

End cap 16 is provided with a flange 11 which is in practice about ⅛ inch smaller in diameter than the inside of main body 1. In the periphery of flange 11 is a groove into which is fitted rubber guide ring 13. Guide ring 13 is suitably notched or serrated to permit unrestricted flow of water yet serve as a guide for the motion of elevating ram 5. Projecting from the periphery of end cap 16 and below guide ring 13 is a key 18 which extends into keyway 19 in the main body 1. Key 18 has at least ¹⁄₁₆ inch clearance on all sides of its projection into keyway 19. The bottom surface of end cap 16 is relieved and notched as shown by numerals 9 and 10 respectively.

Top ring 2 has a central bore providing at least ¹⁄₁₆ inch clearance around outer shell 20. A rubber guide ring 12, is fitted into a groove in the bore of top ring 2. Guide ring 12 is of such a size that the clearance between the inside of guide ring 12 and the outside of outer shell 20 is in practice less than ¹⁄₆₄ inch on a side.

The operation of the sprinkler will now be readily understood in view of the above description. The water supply line is connected to supply pipe 4 after the entire unit is embedded in the ground such that the main body is substantially vertical and top ring 2 is approximately at the level of the top of the soil. In the absence of water pressure to supply pipe 4 the ram 5 rests in the retracted position as shown in FIG. 3. In this condition the top of the nozzle 14 is well below the top of grass or vegetation and does not present a hazard nor is it subject to damage.

When water pressure is applied to supply pipe 4, water flows into the cavity between main body 1 and ram 5. However, due to the restrictions to flow formed by notches 10 and bottom cap 3, water pressure is first impressed on the clearance between guide ring 12 and outer shell 20. This action causes any dirt or foreign material to be washed away from the top outside of the ram 5 before the upward movement starts. The continuance of water pressure causes the ram 5 to move upward as well as water flow through the tube 15 and thence be discharged through nozzle 14.

During the time required for the ram 5 to move to the extended position, water continues to flow through the clearance between guide ring 12 and outer shell 20 thus preventing the admission of dirt. Also during this time of movement the ram 5 is guided by the two guide rings 12 and 13.

Frequently, particularly when water is supplied from irrigation wells, there is sand and other foreign matter introduced into the sprinkler unit with the water. As previously noted, the guide rings 12 and 13 are made of rubber or other soft elastomer material. If, on the occasion of elevating or retracting ram 5, sand particles become entrapped in the clearance between the outer shell 20 and guide ring 12 or between the outside of guide ring 13 and the inside of main body 1, said particles are rolled or passed by the guide rings due to the flexibility of the guide ring material thus preventing damage or failure of the unit to operate.

At the completion of the elevating stroke stop ring 8 is forced against top ring 2 thus preventing further flow of water past guide ring 12. All water supplied now passes through the tube 15 and is discharged through nozzle 14 at a height well above the vegetation.

At the end of the sprinkling time the water pressure supply is shut off by valves or other conventional means well known to those skilled in the art. In the absence of water pressure, the ram 5 being filled with a heavy material 17, descends to the retracted position with force adequate to cause the entrapped water to be in part forced out past the guide ring 12 thus preventing the admission of dirt during the retraction motion of ram 5. During this period, as during the extension of ram 5, particles of sand or foreign matter can be rolled past guide rings 12 and 13.

In the preferred embodiment the cross sectional area of the ram 5 is at least 1.5 square inches resulting in a relatively high extending force of the ram even when the supplied water pressure is relatively low. The weight of the ram 5 is in such proportion to the force of the water pressure that the downward force during retraction is also substantial. These forces are adequate to break or separate vegetation which may grow over the retracted position.

The key 18 operating in keyway 19 serves to prevent appreciable rotation of ram 5 thus making possible the use of either circular or restricted direction spray nozzles.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed new and desired to secure by Letters Patent is:

1. An irrigation sprinkler comprising, an enclosed stationary compartment, fluid supply connection to said compartment, a ram slidably mounted in and projecting from, said stationary compartment, said ram being so shaped as to form an enclosed chamber within said ram, said enclosed chamber being filled with a material for the purpose of increasing the effective weight of said ram, resilient guides permitting longitudinal movement of said ram telescopically from and into said stationary compartment, a passage through said ram permitting a flow of fluid from said supply connection to the exposed end of said ram, a sprinkler nozzle attached to the exposed end of said passage, a stop projection limiting the outward motion of said ram, and a means of preventing rotation of the ram about the longitudinal axis of said ram.

2. An irrigation sprinkler as recited in claim 1 wherein the resilient guides are so shaped as to restrict all movement of said ram except telescopically from and into said stationary compartment, said resilient guides being of such size and shape as to permit a restricted flow of fluid and passage of solid particles in said fluid, past said resilient guides during the time of motion of said ram.

3. An irrigation sprinkler as recited in claim 1 wherein said ram and said stationary compartment are so shaped as to restrict the flow of fluid which causes movement of the ram, during the initial outward motion of the ram.

References Cited

UNITED STATES PATENTS

| | | | |
|---|---|---|---|
| 455,913 | 7/1891 | Walker | 137—534 |
| 2,546,574 | 3/1951 | Wilcox | 239—204 |
| 2,595,598 | 5/1952 | Morton | 239—204 |
| 3,118,609 | 1/1964 | Glover | 239—205 |

EVERETT W. KIRBY, *Primary Examiner.*